(12) United States Patent
Aoki et al.

(10) Patent No.: US 10,776,898 B2
(45) Date of Patent: Sep. 15, 2020

(54) PROJECTION SYSTEM, IMAGE PROCESSING DEVICE AND PROJECTION METHOD

(71) Applicant: Panasonic Intellectual Property Management Co., Ltd., Osaka (JP)

(72) Inventors: Asuka Aoki, Osaka (JP); Ken Mashitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/373,998

(22) Filed: Apr. 3, 2019

(65) Prior Publication Data

US 2019/0385272 A1    Dec. 19, 2019

(30) Foreign Application Priority Data

Jun. 14, 2018    (JP) .................................. 2018-113782

(51) Int. Cl.
  *G06T 3/00* (2006.01)
  *G09G 3/00* (2006.01)
  *G06T 7/70* (2017.01)
  *H04N 9/31* (2006.01)

(52) U.S. Cl.
  CPC ............... *G06T 3/005* (2013.01); *G06T 7/70* (2017.01); *G09G 3/001* (2013.01); *G06T 2207/10048* (2013.01); *H04N 9/3185* (2013.01); *H04N 9/3194* (2013.01)

(58) Field of Classification Search
None
See application file for complete search history.

(56) References Cited

U.S. PATENT DOCUMENTS

2016/0119602 A1\* 4/2016 Yushiya ............... H04N 9/3185

FOREIGN PATENT DOCUMENTS

| JP | 2007-312026 | 11/2007 |
| JP | 2013-192189 | 9/2013 |
| JP | 2015-197647 | 11/2015 |

\* cited by examiner

*Primary Examiner* — Samira Monshi
(74) *Attorney, Agent, or Firm* — Wenderoth, Lind & Ponack, L.L.P.

(57) ABSTRACT

A projection system includes a visible light projector, a camera and an image processor. The visible light projector projects an image with visible light onto the object. The camera captures an image of the object and has an optical axis not coinciding with an optical axis of the visible light projector. The image processor generates an image to be projected with visible light onto the object based on the image captured by the camera. The image processor includes a corrector and an image generator. The corrector corrects a deviation between a projection image and the object. The corrector is configured to calculate a projection region on the object onto which an image is projected by the visible light projector. The image generator is configured to generate image data to project the image to be projected onto the object onto the projection region.

4 Claims, 16 Drawing Sheets

PROJECTIVE COORDINATE SYSTEM

PROJECTION SYSTEM, IMAGE PROCESSING DEVICE AND PROJECTION METHOD

BACKGROUND

1. Technical Field

The present disclosure relates to a projection system, an image processor and a projection method for projecting onto an object an image corresponding to a position of the projection target object.

2. Related Art

JP 2013-192189 A discloses a controller, a projection system, a program and an image processing method for mapping objects such as patterns and colors onto the surface of the object by applying the irradiation light onto the object. The controller of JP 2013-192189 A includes imaging means, an image acquisition unit for acquiring an image including an object captured by the imaging unit, region extraction means for extracting a projection region of the object from the image acquired from the image acquisition means, and mapping means for mapping an object corresponding to the projection region onto the projection region. Thus, even if the object undergoes shape change, movement, and the like, the image of the object is mapped onto the object.

SUMMARY

The present disclosure provides a projection system, an image processor and a projection method for correcting a deviation between a projection image and the object generated when the object moves, and for preventing the deviation between the projection image and the object from occurring even if the object moves.

One aspect of the present disclosure provides a projection system including:
  a visible light projector for projecting an image with visible light onto the object;
  a camera for capturing an image of the object, the camera having an optical axis not coinciding with an optical axis of the visible light projector;
  an image processor for generating an image to be projected with visible light onto the object based on the image captured by the camera.
The image processor includes:
  a corrector for correcting a deviation between a projection image and the object caused by a difference between the optical axis of the visible light projector and the optical axis of the camera according to a position of the object, the corrector configured to calculate a projection region on the object onto which an image is projected by the visible light projector, and
  an image generator configured to generate image data to project the image to be projected onto the object onto the projection region.

Another aspect of the present disclosure provides an image processor including: an image output configured to output image data indicating an image with visible light projected onto an object by a visible light projector;
    an image input configured to input image data of the object captured by a camera having an optical axis not coinciding with an optical axis of the visible light projector; and
    a controller configured to generate the image data based on an image indicated by the image data.
The controller includes:
  a corrector for correcting a deviation between a projection image and the object caused by a difference between the optical axis of the visible light projector and the optical axis of the camera according to a position of the object, the corrector configured to calculate a projection region on the object onto which an image is projected by the visible light projector, and
  an image generator configured to generate image data to project the image to be projected onto the object onto the projection region.

Still another aspect of the present disclosure provides a projection method including:
  preparing a visible light projector at a position where an image with visible light is configured to be projected onto an object;
  preparing a camera configured to capture an image of the object to have an optical axis not coinciding with an optical axis of the visible light projector;
  correcting a deviation between a projection image and the object caused by a difference between the optical axis of the visible light projector and the optical axis of the camera according to a position of the object,
  determining a projection region on the object onto which an image is projected by the visible light projector;
  generating image data to project an image to be projected onto the object onto the projection region; and
  projecting an image indicated by the generated image data by the visible light projector.

According to the present disclosure, a projection system for correcting a deviation between a projection image and the object generated when the object moves, and for preventing a deviation between the projection image and the object from occurring even if the object moves is obtained.

DETAILED DESCRIPTION OF PREFERRED EMBODIMENT

Embodiments of the present disclosure will now be described in detail with reference to the accompanying drawings. However, description in more detail than is necessary can be omitted. For example, detailed descriptions of well-known matters and redundant descriptions of substantially identical constituent elements are omitted so as to avoid unnecessarily redundant description and enable those of skill in the art to readily understand the embodiments herein.

It should be noted that the inventors provide the accompanying drawings and description below to allow those of skill in the art to satisfactory understand the present disclosure. Accordingly, the drawings and the description are not intended to limit the subject matter defined in the claims.

First Embodiment

The first embodiment will be described with reference to FIGS. 1 to 8B.

[1-1. Configuration]

Figure 1:
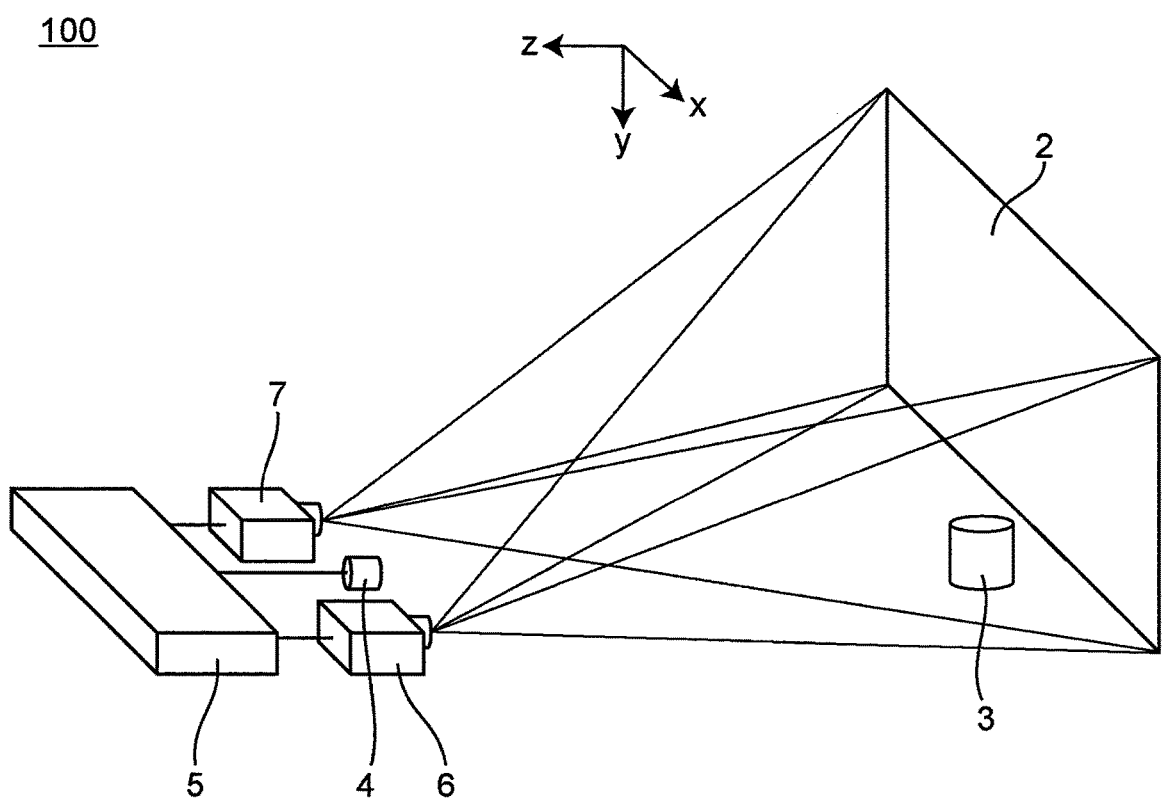
FIG. 1 shows a configuration of a projection system according to a first embodiment.

FIG. 1 shows a configuration of a projection system 100 according to the first embodiment. The projection system 100 is a system that performs projection mapping for projecting, onto a screen 2 and an object 3 such as a person or thing that may move between the projection system 100 and the screen 2, images corresponding to their positions and shapes.

A texture image including a pattern, a color, a mark, a symbol, and the like is projected onto the object 3.

As shown in FIG. 1, for convenience of illustration, the vertical direction downward is defined as the y-axis, the horizontal direction perpendicular to the y-axis is defined as the x-axis, and the direction perpendicular to the x-axis and the y-axis is defined as the z-axis.

In the example in FIG. 1, the screen 2 has a rectangular planar shape on the x-y plane. However, the shape of the screen 2 is not limited thereto, and may be a sphere, a curved surface, or the like, or may have irregularities. In addition, the screen 2 is obtained by, for example, processing paper or cloth into a rectangle for projection, but is not limited thereto, and may be a wall surface of a building or a naturally formed rock wall.

The projection system 100 includes a screen 2 and a camera 4 for capturing the object 3. The camera 4 is a camera which has an image sensor such as a CCD or CMOS image sensor and is sensitive to visible light and infrared rays. The projection system 100 further includes an image processor 5. Based on the image captured by the camera 4, the image processor 5 generates images to be projected onto the screen 2 and the object 3, and controls each part of the projection system 100.

The projection system 100 further includes a visible light projector 6 for projecting an image generated by the image processor 5 onto the screen 2 and the object 3 with visible light, and an infrared projector 7 for projecting a pattern image with infrared rays for measuring their shapes and positions onto the object 3.

The visible light projector 6 is a projector for projecting an image with visible light using a technology such as DLP, 3LCD, LCOS, or DMD technology, or the like. The visible light projector 6 projects an image including various image contents based on the image data input from, for example, the image processor 5.

The infrared projector 7 is a projector for projecting an image with infrared rays using a technology such as DLP, 3LCD, LCOS, or DMD technology, or the like. The infrared projector 7 projects a pattern image for measuring the shape and position of the object 3 by using the space encoding method based on the image data input from, for example, the image processor 5.

The visible light projector 6 and the infrared projector 7 are arranged so as to be capable of projecting an image with light onto an identical region, for example, the screen 2 and the object 3. The optical axis of the visible light projector 6 and the optical axis of the infrared projector 7 do not coincide with each other in FIG. 1, but they may be optically coupled so as to coincide with each other.

The camera 4 is arranged at a position capable of capturing an image of a region (for example, the screen 2 and the object 3) onto which an image is projected by the visible light projector 6 and the infrared projector 7. In addition, the camera 4 is arranged so that the optical axis of the camera 4 does not coincide with any of the optical axis of the visible light projector 6 and the optical axis of the infrared projector 7.

The projection system 100 projects a content image with visible light from the visible light projector 6 onto the screen 2 and the object 3. The position and the shape of the object 3 are measured by using the infrared projector 7 and the camera 4 so that an image (texture image) to be projected onto the object 3 of the content images is projected onto the object 3 even if the object 3 moves.

Figure 2:
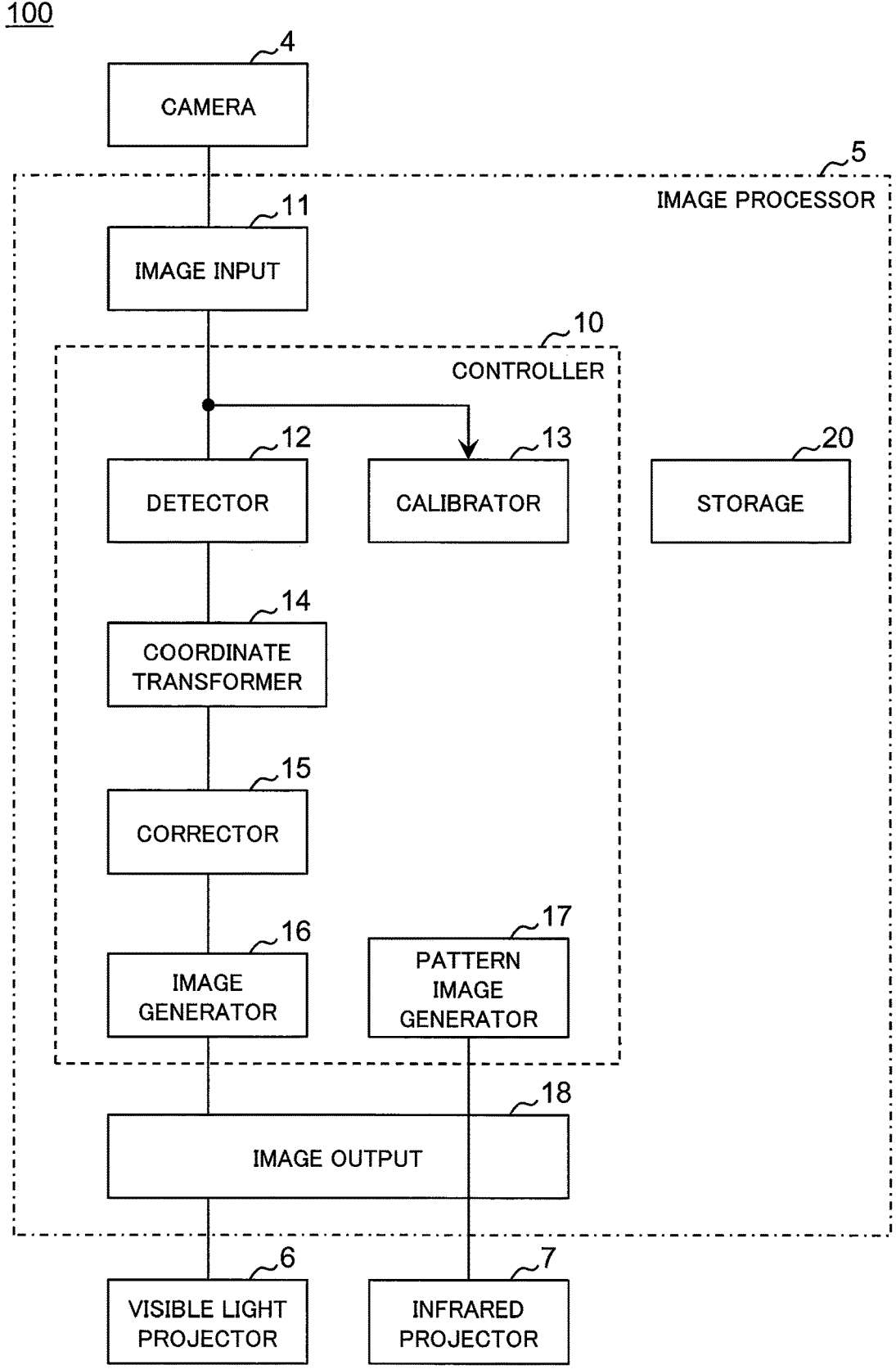
FIG. 2 shows a specific configuration of an image processor of the projection system according to the first embodiment.

FIG. 2 shows a specific configuration of the image processor 5. The image processor 5 includes a controller 10, a storage 20, an image input 11 for receiving an image captured by the camera 4, and an image output 18 for outputting image data generated in the controller 10.

The controller 10 is a device that controls the overall operation of the image processor 5. The controller 10 includes a general-purpose processor, such as a CPU or an MPU, which achieves a predetermined function by executing a program. The controller 10 achieves various kinds of control in the image processor 5 by calling and executing the control program stored in the storage 20. The controller 10 is not limited to those that achieve a predetermined function in cooperation between hardware and software, and may be a hardware circuit designed exclusively for achieving a predetermined function. That is, the controller 10 can be achieved by various processors such as a CPU, an MPU, a GPU, an FPGA, a DSP, and an ASIC.

The storage 20 is a medium for storing various pieces of information. Specifically, the storage 20 is achieved only with a storage device, such as a semiconductor memory device such as a flash memory or an SSD or a disk device such as a hard disk, or achieved with appropriate combination of these. In the storage 20, a control program executed by the controller 10, image data, and the like are stored. In addition, the storage 20 may act as a workspace for the controller 10.

The image input 11 is an interface circuit (module) for connecting the image processor 5 and a peripheral device (for example, the camera 4). In addition, the image output 18 is an interface circuit (module) for connecting the image processor 5 and peripheral devices (for example, the visible light projector 6 and the infrared projector 7). Various interfaces such as Universal Serial Bus (USB), High Definition Multimedia Interface (HDMI) (registered trademark), IEEE 1394, Bluetooth (registered trademark), and the like are used as the image input 11 and the image output 18.

The controller 10 includes a detector 12 for detecting the position of the object 3 based on the image input into the image input 11.

The controller 10 further includes a calibrator 13 for calculating a coordinate transformation matrix that associates each pixel of the image with the visible light projected by the visible light projector 6 with each pixel of the camera 4 based on the image captured by the camera 4. The coordinate transformation matrix transforms the coordinate system viewed from the camera 4 (hereinafter referred to as "camera coordinate system") into the coordinate system for image projection by the visible light projector 6 (hereinafter referred to as "visible light projective coordinate system"). The coordinate transformation matrix is stored in the storage 20.

Furthermore, the calibrator 13 can also associate each pixel of the image with infrared rays projected by the infrared projector 7 with each pixel of the camera 4. Thus, the pixels of the visible light image, the infrared image, and the camera are associated with each other.

The controller 10 further includes a coordinate transformer 14 for calculating the position of the object 3 in the visible light projective coordinate system in the position of the object 3 in the camera coordinate system detected by the detector 12 by applying the coordinate transformation matrix.

As will be described below, even if an image is projected so as to match the position of the object 3 in the visible light projective coordinate system calculated by the coordinate transformer 14, when the object 3 moves in the z direction from the position where the calibration is performed, the position of the texture image is deviated from the position of the object 3. Thus, the controller 10 further includes a corrector 15 for correcting such deviation and making the position of the texture image coincide with the position of the object 3. Details of the correction method will be described below.

The controller 10 further includes an image generator 16 for generating image data to be projected onto the screen 2 and the object 3 from the content image data given in advance according to the corrected position of the object 3 obtained by the corrector 15. The image data generated by the image generator 16 is transmitted to the visible light projector 6 via the image output 18 and is projected onto the screen 2 and the object 3 by the visible light projector 6.

The controller 10 further includes a pattern image generator 17 that generates pattern image data for measuring the shape and position of the object 3 by using the space encoding method. The pattern image data generated by the pattern image generator 17 is transmitted to the infrared projector 7 via the image output 18 and is projected onto the object 3 by the infrared projector 7.

[1-2. Calibration Operation]

In the following, the calibration operation performed by the projection system 100 according to the present embodiment will be described.

Figure 3:
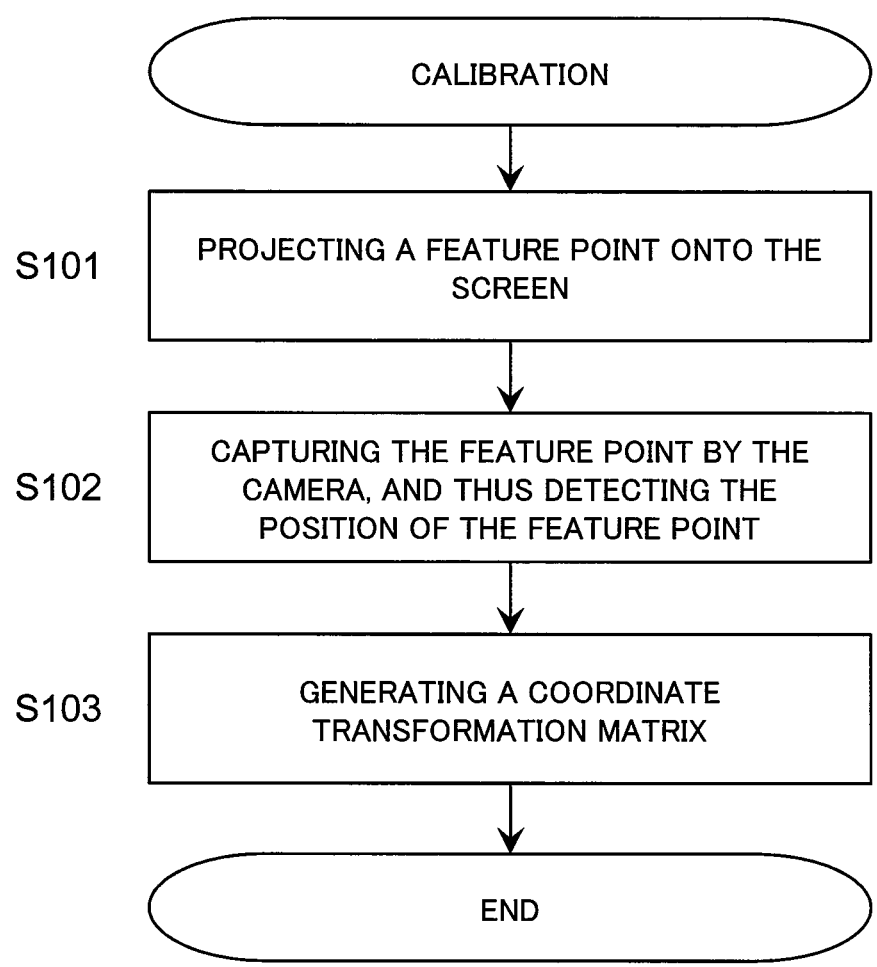
FIG. 3 is a flowchart showing a flow of calibration processing by the projection system according to the first embodiment.

FIG. 3 is a flowchart showing the flow of the calibration processing by the projection system 100. With reference to FIGS. 1 to 3, the calibration processing will be described.

First, the visible light projector 6 projects a feature point onto the screen 2 (S101). Next, the feature point is captured with the camera 4 (S102).

Figure 4:
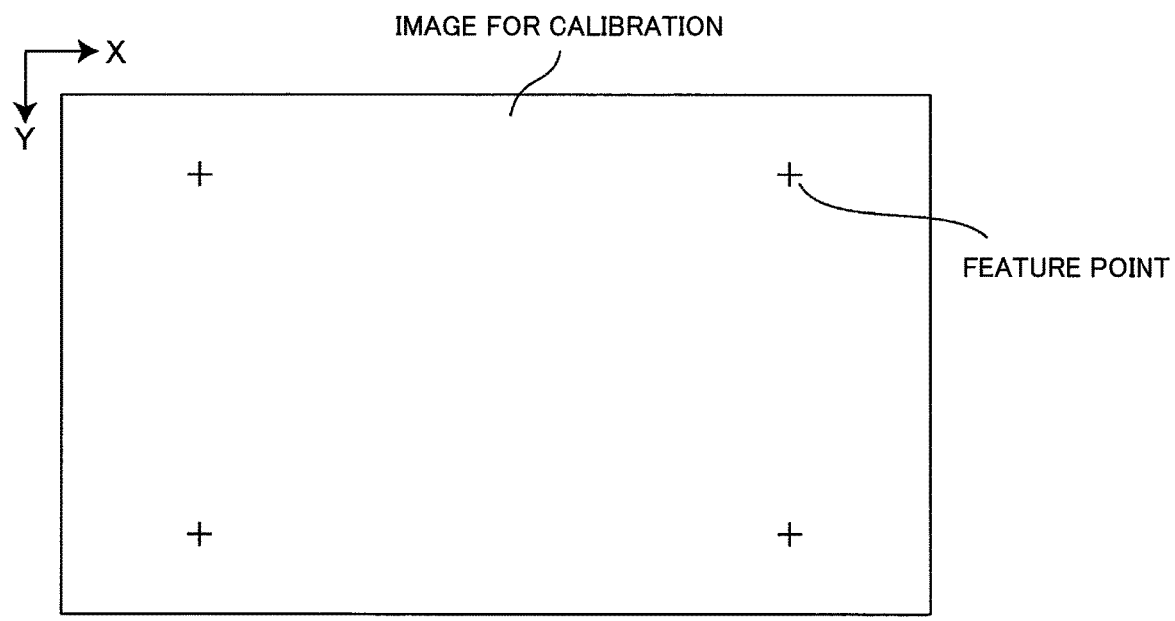
FIG. 4 shows feature points used for calibration processing by the projection system according to the first embodiment in a visible light projective coordinate system.

In FIG. 4, four feature points in the visible light projective coordinate system are shown. The feature point to be projected by the visible light projector 6 is, for example, two line segments which intersect as shown in FIG. 4.

Figure 5:
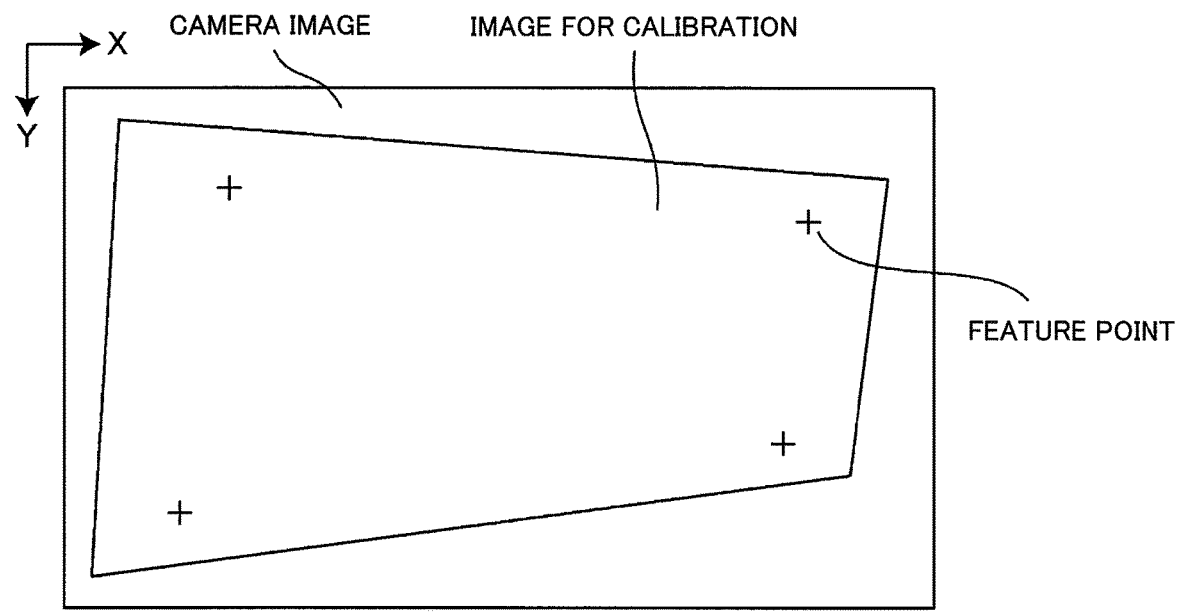
FIG. 5 shows the feature points in FIG. 4 as viewed from a camera coordinate system.

When the feature point projected by the visible light projector 6 is viewed in the camera coordinate system, in the case where the calibration processing is not performed, the feature point is seen as in FIG. 5. Thus, unless the calibration processing is performed, the image viewed from the camera 4 appears distorted. That is, when projection mapping is performed without performing the calibration processing, for a spectator in a position different from the visible light projector 6, the projection image appears distorted and the stage effect of projection mapping is impaired.

Thus, the calibrator 13 of the image processor 5 calculates a coordinate transformation matrix that associates each pixel of the image with the visible light projected by the visible light projector 6 with each pixel of the camera 4 (S103). The coordinate transformation is, for example, a projective transformation, an affine transformation, or a perspective projection transformation. The calculated coordinate transformation matrix is stored in the storage 20 and is used when projection mapping is performed. Applying this coordinate transformation matrix to the data to be projected when performing the projection mapping solves the problem that the image seen from the camera 4 appears distorted.

Before or after the above calibration processing, calibration processing for associating each pixel of the image with infrared rays projected by the infrared projector 7 with each pixel of the camera 4 may be performed. Thus, the pixels of the visible light image, the infrared image, and the camera are associated with each other.

[1-3. Measurement Principle of Position and Shape]

In the present embodiment, an active stereo measurement method and a space encoding method are adopted as means for measuring the position and shape (depth) of the object 3.

Figure 6:
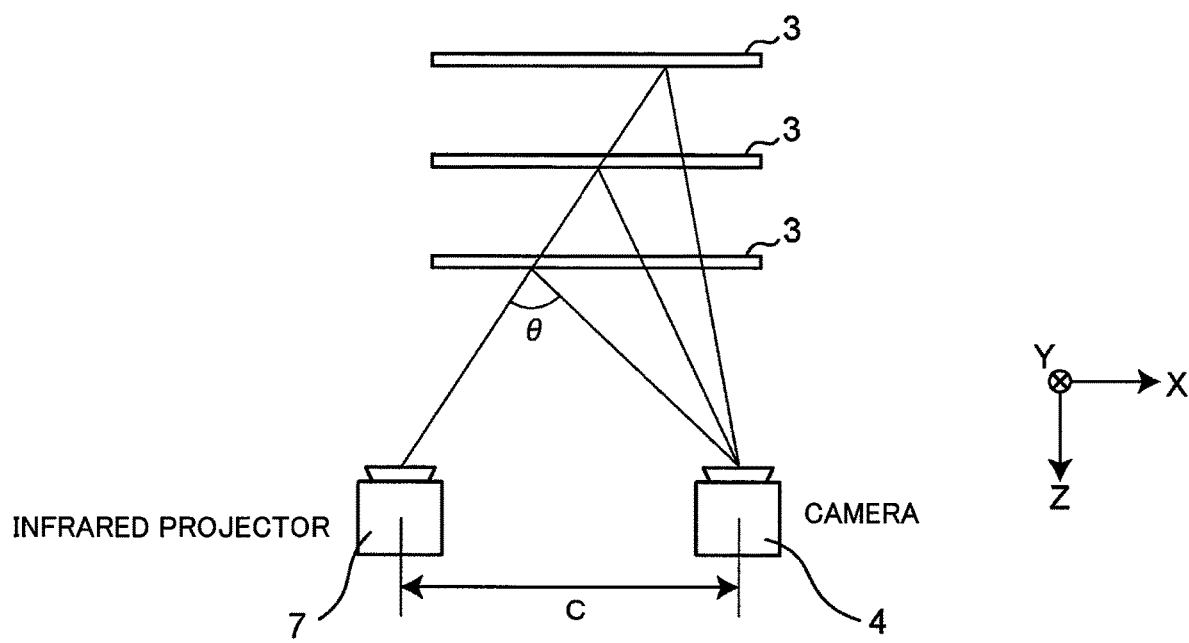
FIG. 6 shows a measurement principle of the position and shape of an object in a projection system.

FIG. 6 illustrates an active stereo measurement method. In FIG. 6, the camera 4 and the infrared projector 7 are arranged in the same z position at an interval C in the x direction. The infrared rays emitted from the infrared projector 7 is incident on and reflected by the surface of the object 3, and the reflected light is incident on the camera 4. As shown in FIG. 6, the angle formed by the incident optical path and the reflection optical path (hereinafter referred to as "parallax") is denoted as θ. Thus, when the image projected by the infrared projector 7 is captured from the camera 4, the image is deviated by the parallax θ. Then, as shown in FIG. 6, as the distance in the z direction between the camera 4 and the object 3 changes, the x coordinate of the position of the infrared reflection point in the captured image of the camera 4 changes.

Based on such change in coordinates, the controller 10 of the image processor 5 performs calculation based on the triangulation with the interval C between the camera 4 and the infrared projector 7 as the base line length and calculates the distance in the z direction between the camera 4 and the object 3. Changes in coordinates are measured by using a measurement pattern based on the space encoding method.

[1-4. Correcting Operation]

The correcting operation to the deviation of the texture image after the calibration processing, which is performed by the corrector 15 shown in FIG. 2, is performed in the projection mapping operation to be described below. The correcting operation is one of the characteristics of the present embodiment, so that an description thereof is particularly provided here.

Figure 7:
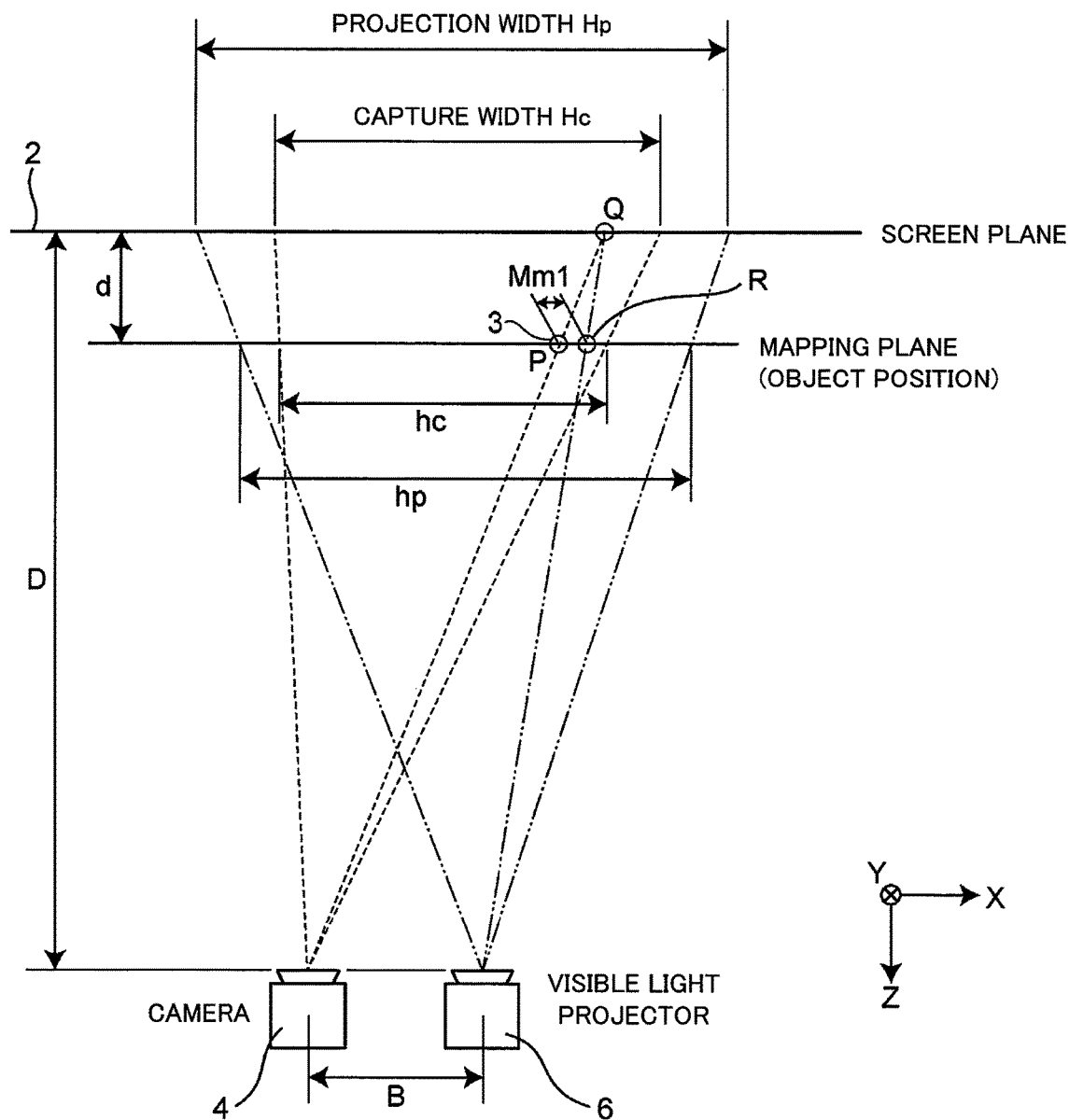
FIG. 7 illustrates that the position of a texture image and the position of an object deviate when the object moves.

FIG. 7 illustrates that the position of the texture image and the position of the object 3 are deviated when the object 3 moves from the position where the calibration is performed. FIG. 7 shows the screen 2, the object 3, the camera 4, and the visible light projector 6 as seen from above. In FIG. 7, the object 3 is not on the screen 2 but at the position of a point P on a plane, parallel to the screen 2, apart from the screen 2 in the z direction by a distance d (hereinafter referred to as "mapping plane").

The above-described calibration operation is performed by projecting feature points onto the screen 2 by the visible light projector 6 and capturing the feature points with the camera 4. That is, the calibration operation is performed with the screen 2 as a reference. Therefore, when recognizing the position of the object 3 based on the image captured by the camera 4, the controller 10 recognizes that the object 3 is at the position of the point Q where the straight line passing through the camera 4 and the point P intersects the screen 2.

Therefore, the image processor 5 controls the visible light projector 6 to project the texture image onto the position of the point Q. However, since the mapping surface of the object 3 is in front of the screen 2, the texture image is projected onto the position of the point R where the straight line passing through the visible light projector 6 and the point Q intersects the mapping surface. For this reason, the texture image essentially supposed to be projected onto the position P on the mapping surface is projected onto the position R, causing a deviation in the projection position.

In this way, when the object 3 is positioned in front of the plane (calibration plane, screen 2 in the illustrated example) on which the calibration is performed (that is, between the calibration plane and the camera 4), the position of the texture image and the position of the object 3 deviate from each other.

Figure 8A:
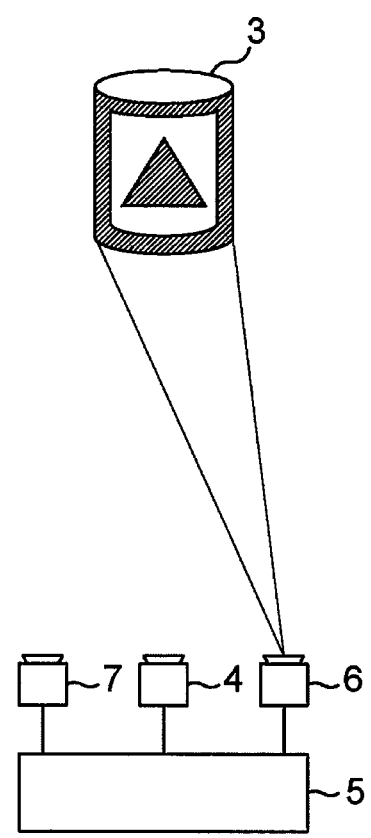
FIG. 8A shows a state in which the position of the texture image and the position of the object do not deviate.
Figure 8B:
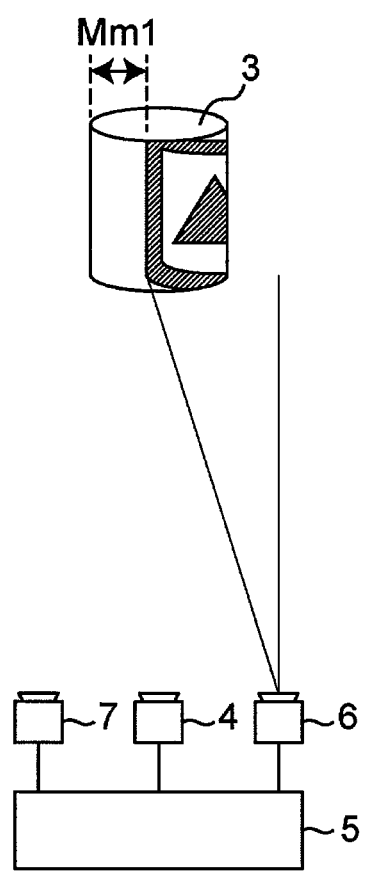
FIG. 8B shows a state in which the position of the texture image and the position of the object deviate.

For example, when the object 3 is in the calibration plane, the image is properly projected onto the object 3 as shown in FIG. 8A. On the other hand, when the object 3 is positioned in front of the calibration plane, as shown in FIG. 8B, the position of the texture image and the position of the object 3 deviate from each other by Mm1.

The deviation amount Mm1 of the projection image, that is, the distance between the point P and the point R in FIG. 7 is expressed by the following mathematical expression.

[Mathematical 1]

$$Mm1 = B\frac{d}{D} \qquad \text{(Expression 1)}$$

where B is the distance in the x direction between the camera 4 and the visible light projector 6, D is the distance in the z direction between the camera 4 and the screen 2, and d is the distance in the z direction between the screen 2 and the mapping surface or object 3.

The direction of deviation of the projection image (the position of the point R with respect to the point P) depends on the positional relationship between the camera 4 and the visible light projector 6. As shown in FIG. 7, when the visible light projector 6 is in the +x direction (right direction on the page) of the camera 4, the direction of deviation of the projection image is also in the +x direction.

In addition, the width in the x direction of the image that can be projected by the visible light projector 6 on the mapping surface (hereinafter referred to as "projection width") hp and the correction amount Mx1 obtained by converting the deviation amount Mm1 of the projection image into the number of pixels are expressed by the following mathematical expressions.

[Mathematical 2]

$$hp = Hp\frac{D-d}{D} \qquad \text{(Expression 2)}$$

[Mathematical 3]

$$Mx1 = Ph\frac{Mm1}{hp} \qquad \text{(Expression 3)}$$

where Hp is the projection width on the screen 2, and Ph is the number of horizontal pixels (the number of pixels in the x direction) of the visible light projector 6.

In order to eliminate the deviation of the projection position as described above, the corrector 15 can cause the visible light projector 6 to project the image properly onto the object 3 by correcting the position of the image to deviate by the correction amount Mx1.

The distance D and the distance d can be measured by the space encoding method by using the pattern image generated by the pattern image generator 17. Therefore, for example, storing the projection width Hp on the screen 2, the distance B in the x direction between the camera 4 and the visible light projector 6, and the horizontal pixel number Ph of the visible light projector 6 in the storage 20 before executing projection mapping allows the projection system 100 to correct the correction amount Mx1 at any time during projection mapping.

In the above description, the correction of deviation in the horizontal direction (x direction) is described, but the deviation in the vertical direction (y direction) can also be similarly corrected.

[1-5. Projection Mapping Operation]

Figure 9:
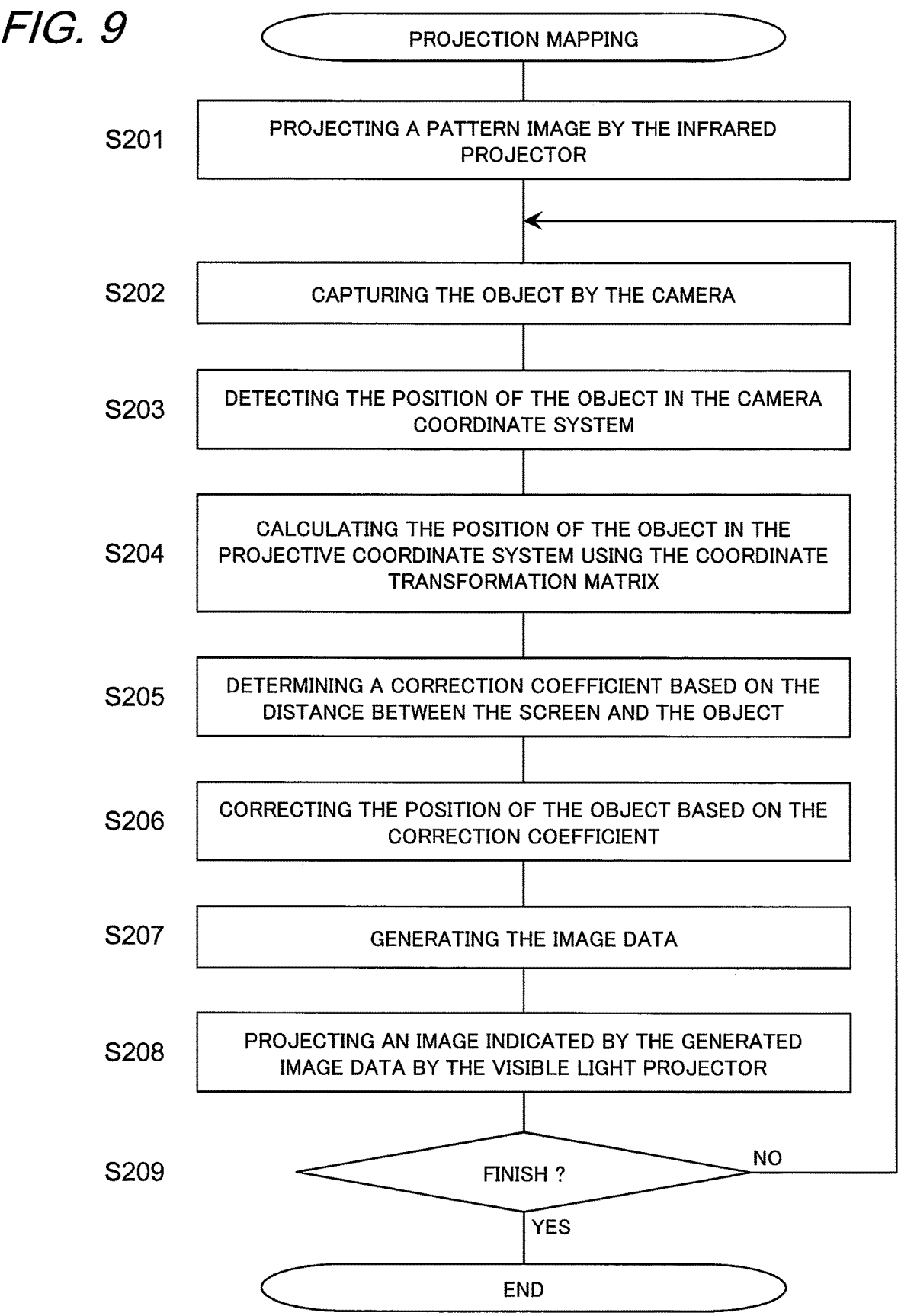
FIG. 9 is a flowchart showing a projection mapping operation by the projection system according to the first embodiment.

FIG. 9 is a flowchart showing the projection mapping operation by the projection system 100. With reference to FIGS. 1, 2 and 9, the projection mapping operation will be described. First, the infrared projector 7 projects a pattern image for measurement with infrared rays onto the object 3 (S201). The pattern image for measurement is generated by the pattern image generator 17 based on the data stored in the storage 20.

The camera 4 captures the object 3 and captures the pattern image projected by the infrared projector 7 (S202).

The controller 10 receives the image data via the image input 11. Based on the received pattern image data, the detector 12 of the controller 10 detects the position of the object 3 in the camera coordinate system, in particular, the distance (depth) in the z direction between the camera 4 and the object 3 (S203).

The coordinate transformer 14 applies the coordinate transformation matrix obtained in the calibration operation shown in FIG. 3 to the position of the object 3 in the camera coordinate system detected in step S203 to calculate the position of the object 3 in the visible light projective coordinate system (S204).

However, as described above, the position of the object 3 calculated in step S204 is deviated from the actual position of the object 3 when the object 3 is not within the calibration plane. Thus, the corrector 15 calculates a correction coefficient (S205) in order to correct such deviation and match the position of the texture image with the actual position of the object 3. The correction coefficient is, for example, Mx1 given by (Expression 3) based on the distance d in the z direction between the screen 2 and the object 3.

The image generator 16 corrects the position of the object 3 calculated in step S204 based on the correction coefficient obtained in step S205 (S206).

Video data to be projected onto the screen 2 and the object 3 is generated from the content image data given in advance (S207) so that the texture image is projected onto the corrected position. That is, the image generator 16 generates image data for projection based on the position of the object 3 after correction.

The image generator 16 transmits the generated image data to the visible light projector 6 via the image output 18, and projects the image onto the screen 2 and the object 3 (S208).

The projection system 100 repeatedly performs the above processing at a predetermined frame rate (S209). Thus, the image content projected from the visible light projector 6 can be made to accurately follow the movement of the object 3.

[1-6. Effects and the Like]

As described above, in the present embodiment, the projection system 100 includes: a visible light projector 6 for projecting an image with visible light onto the object 3; a camera 4 for capturing an image of the object 3, the camera 4 having an optical axis not coinciding with an optical axis of the visible light projector 6; and an image processor 5 for generating an image to be projected by visible light onto the object 3 based on the image captured by the camera 4.

The image processor 5 includes a corrector 15 for correcting a deviation between the projection image and the object 3 caused by a difference between the optical axis of the visible light projector 6 and the optical axis of the camera 4 according to a position of the object 3, the corrector 15 configured to calculate a projection region on the object 3 onto which an image is projected by the visible light projector 6. The image processor 5 further includes an image generator 16 for generating image data so as to project the image to be projected onto the object 3 onto the projection region.

The projection system 100 can correct the deviation between the projection image and the object 3 generated when the object 3 moves during the projection mapping to prevent the deviation between the projection image and the object 3 from occurring even when the object 3 moves.

Second Embodiment

The second embodiment discloses a projection system 200 in which after the execution of the calibration processing and before the demonstration of the projection mapping, a person measures (actually measures) the amount of deviation between the position of the object 3 and the projection position of the texture image, and which corrects the deviation during demonstration of the projection mapping by using the amount of deviation actually measured.

[12-1. Configuration]

Figure 10:
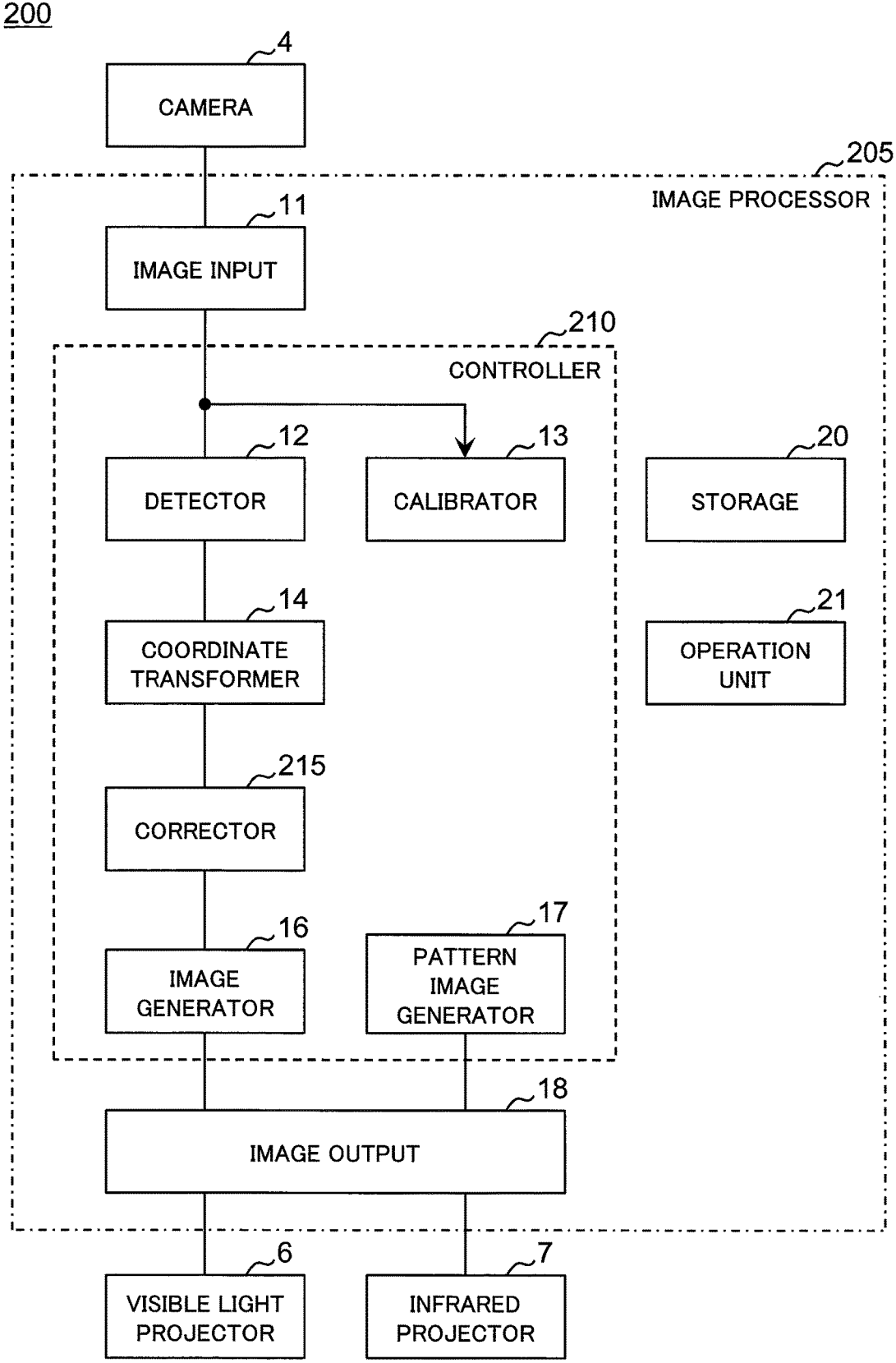
FIG. 10 shows a configuration of a projection system according to a second embodiment.

FIG. 10 shows a configuration of the projection system 200 according to the second embodiment. In the projection system 200 of the present embodiment, in addition to the configuration of the image processor 5 of the first embodiment, the image processor 205 further includes an operation unit 21 for accepting input instructions. The input instructions include a deviation amount Mm2 of the projection image in the actual measurement position described below. Hereinafter, the deviation amount Mm2 is referred to as "actual measurement amount". In addition, the operation of the controller 210 of the projection system 200, particularly the operation of the corrector 215 is different from that of the first embodiment.

The operation unit 21 is an input interface device for accepting input instructions from the user. The operation unit 21 converts the input instructions received from the user and the contents of the operation into an electric signal and transmits the electric signal to the controller 10. The operation unit 21 includes a mouse, a keyboard, a touch panel, buttons, and the like.

[2-2. Actual Measurement Operation]

Figure 11:
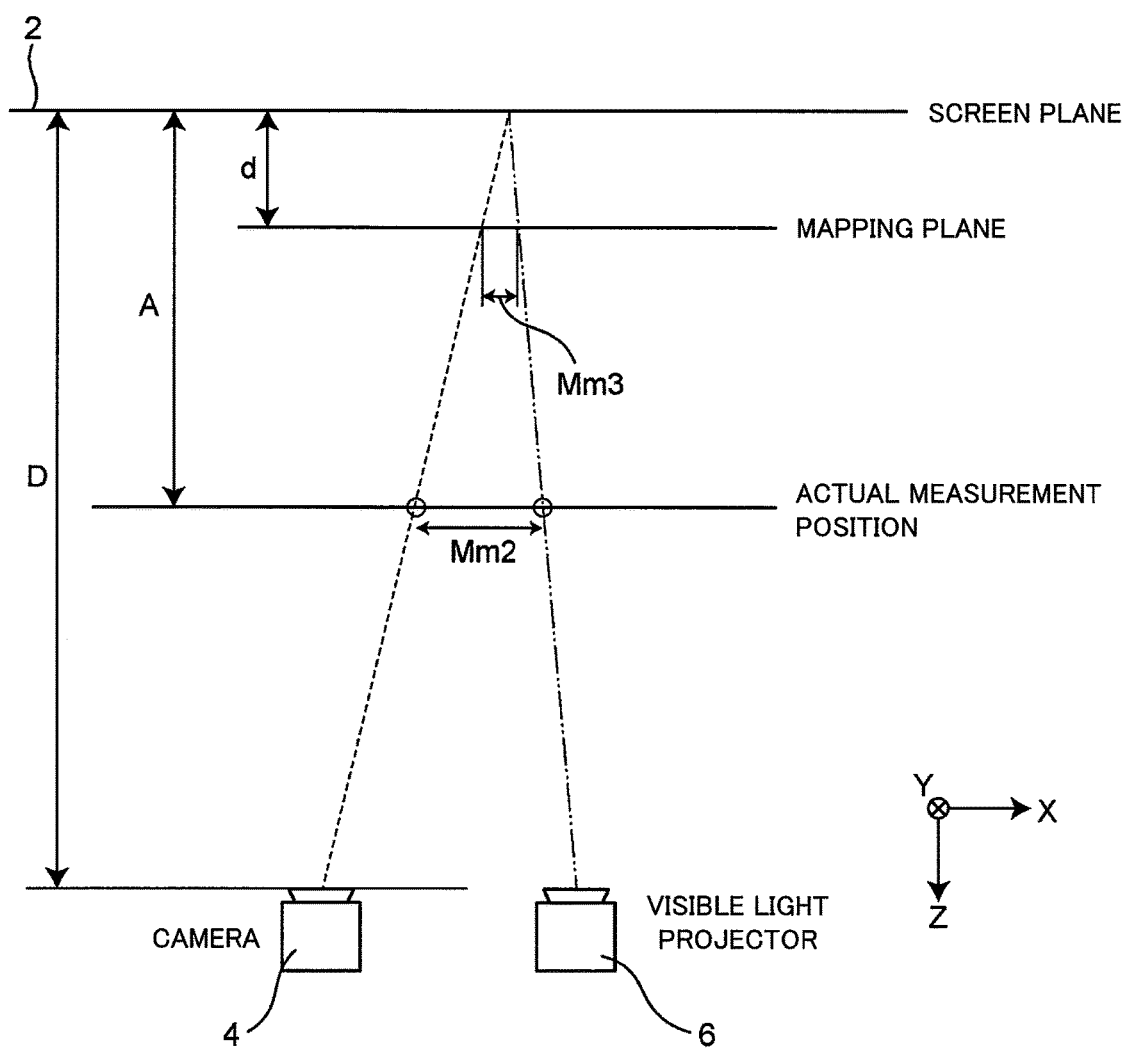
FIG. 11 illustrates an actual measurement operation by the projection system according to the second embodiment.
Figure 12:
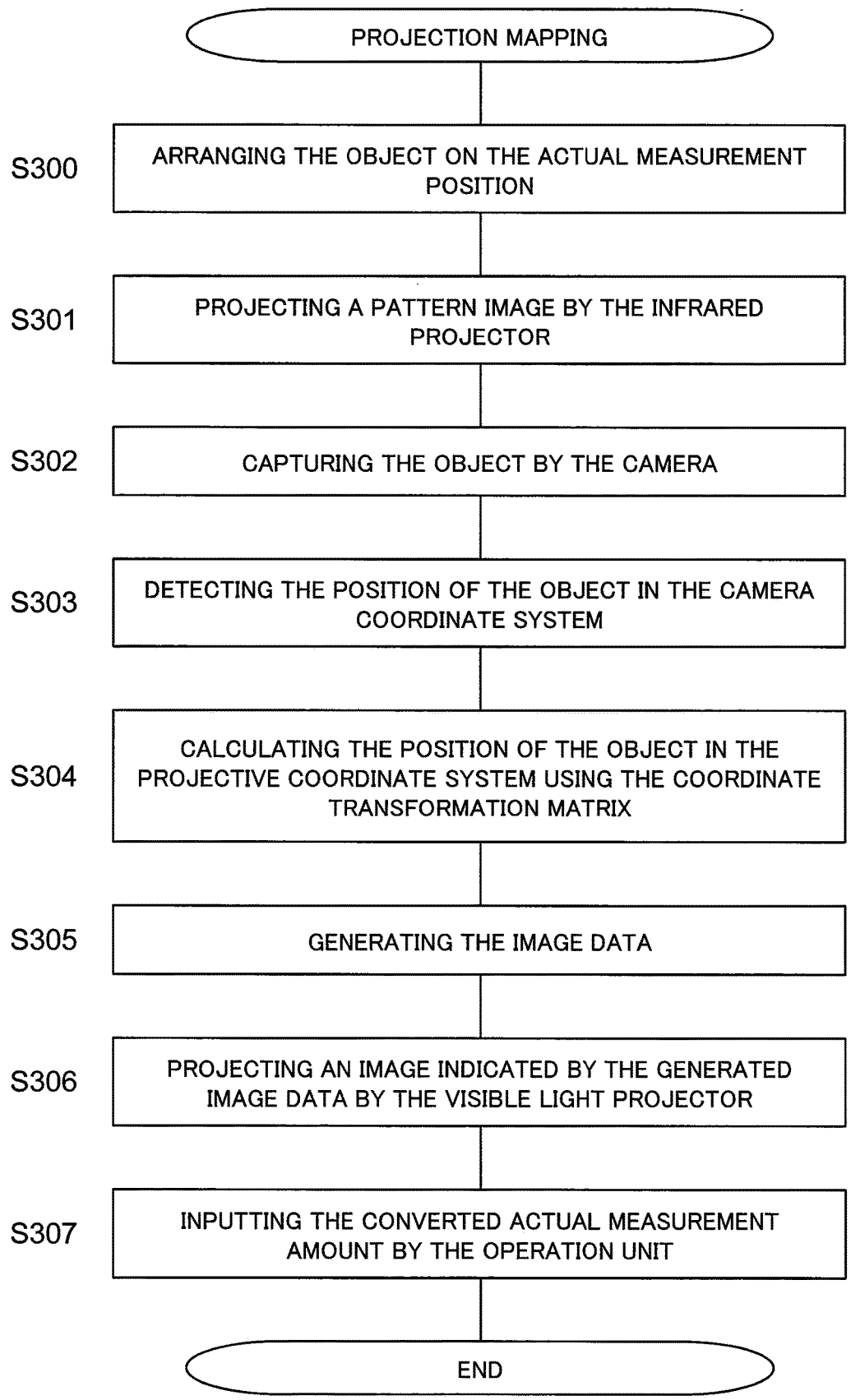
FIG. 12 is a flowchart showing a flow of the actual measurement operation by the projection system according to the second embodiment.

In the present embodiment, after the execution of calibration processing, an actual measurement operation for measuring the actual measurement amount Mm2 is performed. The actual measurement operation by the projection system 200 will be described with reference to FIGS. 10 to 12. FIG. 11 illustrates an actual measurement operation by the projection system 200. FIG. 12 is a flowchart showing a flow of an actual measurement operation by the projection system 200. The actual measurement operation is performed before the demonstration of projection mapping as preparation.

After the execution of calibration processing, the object 3 is arranged in a position (hereinafter referred to as "actual measurement position") away by A in the z direction from the calibration plane (screen plane 2 in the example shown in FIG. 11) (S300).

Next, the infrared projector 7 projects the pattern image for measurement onto the object 3 (S301), and the camera 4 captures the pattern image (S302).

The controller 10 receives the image data via the image input 11, and the detector 12 detects the position of the object 3 in the camera coordinate system based on the received pattern image data (S303).

The coordinate transformer 14 applies the coordinate transformation matrix obtained in the calibration operation to the position of the object 3 in the camera coordinate system detected in step S303 to calculate the position of the object 3 in the visible light projective coordinate system (S304).

Based on the position of the object 3 calculated in step S304, the image generator 16 generates image data for actual measurement to be projected onto the screen 2 end the object 3 from the image data for actual measurement given in advance (S305).

The image data generated by the image generator 16 is transmitted to the visible light projector 6 via the image output 18 and is projected onto the screen 2 and the object 3 by the visible light projector 6 (S306).

When the object 3 is within the calibration plane, the image for actual measurement is properly projected onto the object 3. However, when the object 3 is positioned in the actual measurement position in front of the calibration plane, as shown in FIG. 11, the position of the texture image and the position of the object 3 deviate by Mm2.

Then, the user specifies how many pixels worth of movement of the projection position of the image by the visible light projector 6 will eliminate the deviation between the position of the texture image and the position of the object 3. That is, the user specifies an converted actual measurement amount Mx2 obtained by converting the actual measurement amount Mm2 into the number of pixels, and inputs the converted actual measurement amount Mx2 by using the operation unit 21. The controller 10 acquires the converted actual measurement amount Mx2 input by the user to store it in the storage 20 (S307).

[2-3. Correction Operation]

As shown in FIG. 11, during the projection mapping operation, when the object 3 is in a position (mapping plane) at a distance d from the screen 2 (calibration plane), the position of the texture image and the position of the object 3 deviate by Mm3 without correction. The correction amount Mx3 obtained by converting the deviation amount Mm3 of the projection image on the mapping plane into the number of pixels of the visible light projector 6 is expressed by the following mathematical expression.

[Mathematical 4]

$$Mx3 = Mx2 \frac{d}{A} \qquad \text{(Expression 4)}$$

In the projection system 200 according to the present embodiment, correcting the position of the image to deviate by the correction amount Mx3 with the corrector 215 allows the visible light projector 6 to properly project the image onto the object 3. Furthermore, in the present embodiment, actually measuring the amount of deviation between the position of the object 3 and the projection position of the texture image on the actual measurement plane before the demonstration of the projection mapping allows correction to be performed with higher accuracy as compared with the calculation of the correction amount based on the calculation using the parameters (the distance B between the camera 4 and the visible light projector 6 shown in FIG. 2, the distance D in the z direction between the camera 4 and the screen 2, the distance d in the z direction between the screen 2 and the object 3, the projection width Hp, and the like).

In the above description, the correction of deviation in the horizontal direction (x direction) is described, but the deviation in the vertical direction (y direction) can also be similarly corrected.

[2-4. Effects and the Like]

As described above, in the present embodiment, the projection system 200 further includes an operation unit 21. The corrector 15 corrects the position of the object 3 based on the measurement value, input by the operation unit 21, of the deviation amount between the position of the image projected by the visible light projector 6 and the position of the object 3.

Thus, measuring the deviation amount between the position of the texture image and the position of the object 3 at at least one actual measurement position allows the deviation between the projection image and the object 3 to be prevented from occurring even if the object moves during the projection mapping.

Third Embodiment

[3-1. Configuration]

Figure 13:
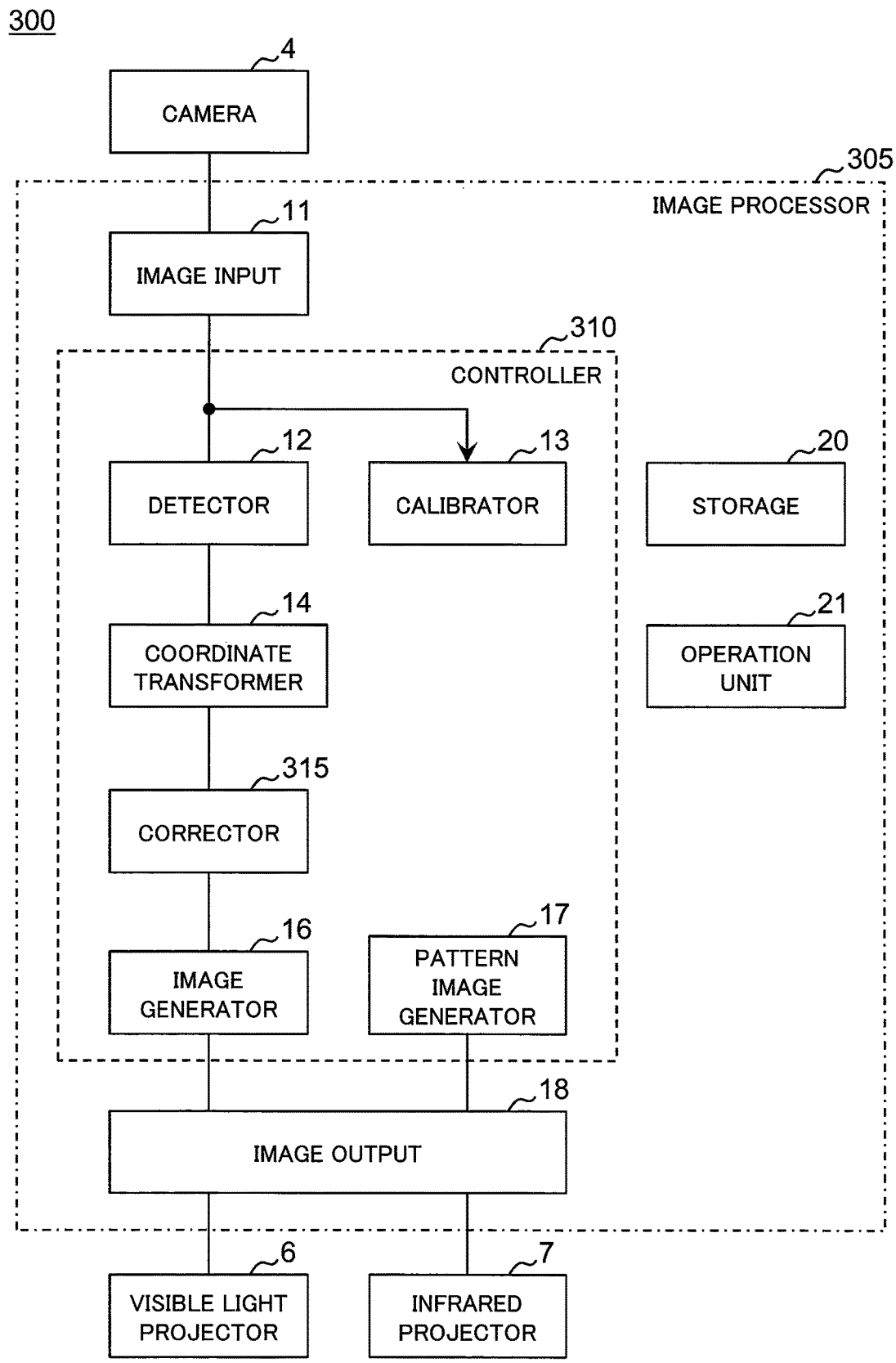
FIG. 13 shows a configuration of a projection system according to a third embodiment.

FIG. 13 shows a configuration of the projection system 300 according to the third embodiment. The projection system 300 includes an image processor 305 including a storage 20, an operation unit 21, and a controller 310. The controller 310 includes a corrector 315.

Figure 14:
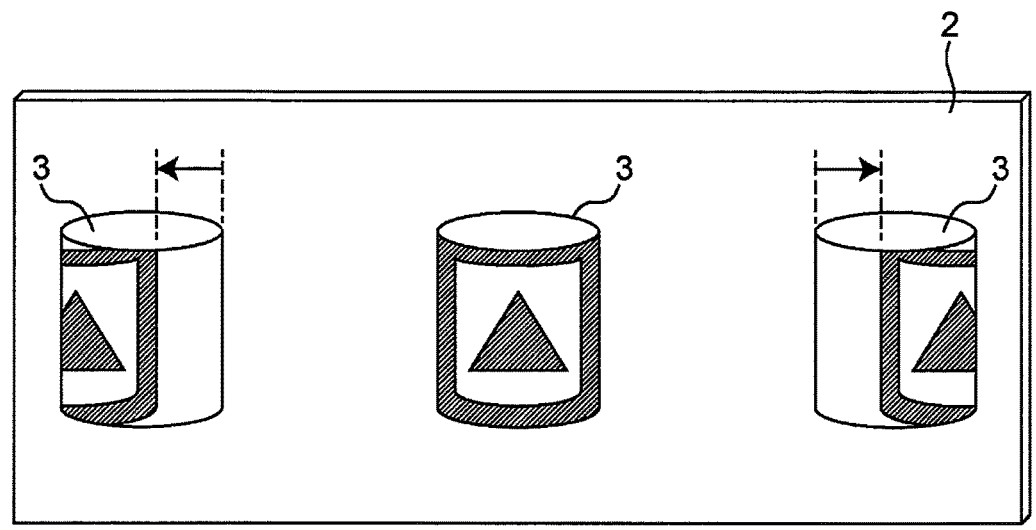
FIG. 14 illustrates a correcting operation by the projection system according to the third embodiment.
Figure 14:
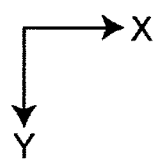
Figure 14:
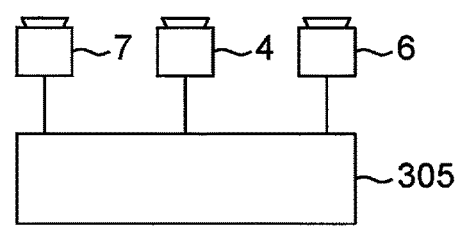

FIG. 14 illustrates a correcting operation by the projection system 300. In the first and second embodiments, it is described that the position of the texture image and the position of the object 3 deviate when the object 3 moves in the z direction from the screen 2 (calibration plane) during the projection napping operation. However, this positional deviation can also be caused by the movement of the object 3 in the x direction or the y direction in the calibration plane. This is due to, for example, the low accuracy of the calibration processing, and the optical axis of the visible light projector 6 and the optical axis of the camera 4 being not parallel to each other.

For example, after the calibration processing, as shown in FIG. 14, when the object 3 is positioned on the left side of the center of the screen 2 as seen from the visible light projector 6 toward the calibration plane, the image may be projected onto the left side of the proper position, and when the object 3 is positioned on the right side from the center of the screen 2, the image may be projected onto the right side of the proper position.

Thus, in the present embodiment, the actual measurement operation and the correcting operation similar to those in the second embodiment are also performed on the deviation of the projection image caused by the movement of the object 3 in the calibration plane.

[3-2. Actual Measurement Operation]

Figure 15:
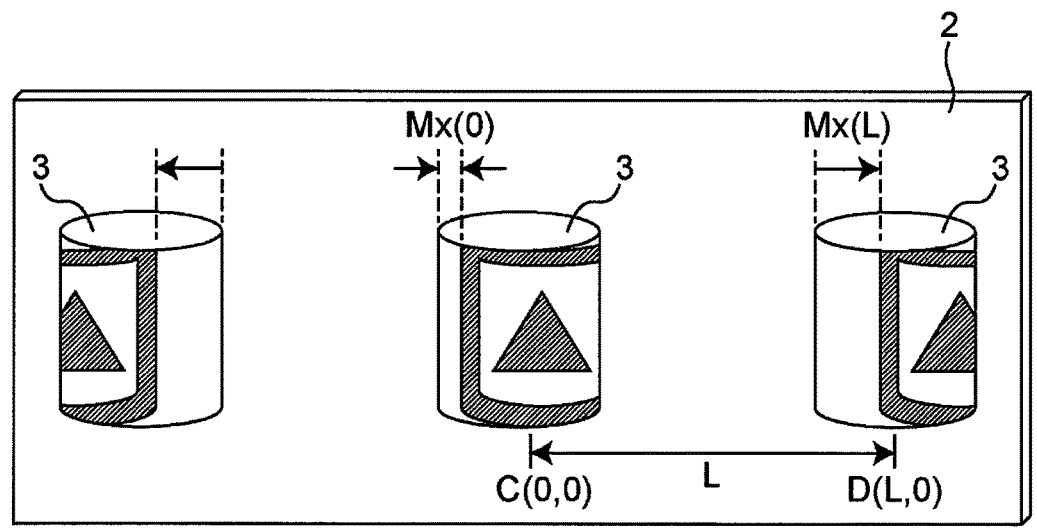
FIG. 15 illustrates an actual measurement operation by the projection system according to the third embodiment.
Figure 15:
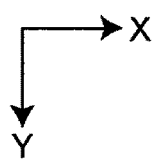
Figure 15:
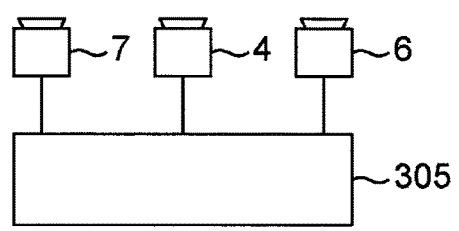

With reference to FIG. 15, an actual measurement operation by the projection system 300 will be described. First, the object 3 is arranged at a predetermined reference point C (0, 0) in the calibration plane spreading in the x-y directions. Next, an image for actual measurement is projected onto the object 3 by the same means as in steps S301 to S307 in FIG. 12 in the second embodiment. The user specifies the converted actual measurement amount Mx (0) obtained by converting the deviation amount between the position of the texture image and the position of the object 3 into the number of pixels, and inputs the converted actual measurement amount Mx (0) into the controller 310 by using the operation unit 21. The converted actual measurement amount Mx (0) is stored in the storage 20.

Next, the object 3 is arranged at a point D (L, 0) away by L in the x direction from the reference point C (0, 0), and an image for actual measurement is projected onto the object 3. The user specifies the converted actual measurement amount Mx (L) obtained by converting the deviation amount into the number of pixels and inputs the converted actual measurement amount Mx (L) into the controller 310 by using the operation unit 21. The converted actual measurement amount Mx (L) is stored in the storage 20.

[3-3. Correction Operation]

From the result obtained by the above actual measurement operation, when the object 3 is at the point X (x, 0), the correction amount Mx (x) for correcting the deviation is expressed by the following mathematical expression.

[Mathematical 5]

$$Mx(x) = \frac{Mx(L) - Mx(0)}{L} \cdot x \qquad \text{(Expression 5)}$$

In the projection system 300, correcting the position of the image to deviate by the correction amount Mx (x) with the corrector 315 allows the visible light projector 6 to properly project the image onto the object 3.

In the above description, the correction of deviation in the horizontal direction (x direction) is described, but the deviation in the vertical direction (y direction) can also be similarly corrected.

Other Embodiments

As described above, the first to third embodiments are described as examples of the technique disclosed in the present application. However, the technique in the present disclosure is not limited to this, and can also be applied to embodiments in which changes, substitutions, additions, omissions, and the like are made as appropriate. In addition, it is also possible to combine each component described in the first to third embodiments to form a new embodiment. Thus, in the following, other embodiments will be exemplified.

In the first to third embodiments, the camera 4 including an image sensor such as a CCD or a CMOS image sensor is described as an example of imaging means (camera). The imaging means has only to capture the object image to generate image data. Therefore, the imaging means is not limited to a camera including an image sensor such as a CCD or a CMOS image sensor.

In addition, as an example of the camera 4, a camera having sensitivity to visible light and infrared rays is described. However, the projection system 100, 200, or 300 may include, for example, a first camera having sensitivity to visible light and a second camera having sensitivity to infrared rays.

In the first to third embodiments, the infrared projector 7 is described as an example of the invisible light projector. The invisible light projector has only to project an invisible light image which cannot be seen by a person. Therefore, the invisible light projector is not limited to the infrared projector 7 for projecting an image with infrared rays. For example, the invisible light projector may be an ultraviolet projector for projecting an image with ultraviolet rays.

In the first to third embodiments, as an example of the image output 18, the image output 18 for outputting both the image data indicating an image projected with infrared rays and the image data indicating an image projected with visible light is described. However, the image processor 5, 205, or 305 may include, for example, a first image output for outputting image data indicating an image projected with visible light and a second image output for outputting image data indicating an image projected with infrared rays.

In the first to third embodiments, it is described that the projection system 100, 200, or 300 projects a pattern image from the infrared projector 7, detects the position and shape of the object 3 by using the image obtained by capturing the pattern image with the camera 4 to detect a projection region, and projects a texture image onto the projection region. However, the projection region onto which the texture image is projected has only to conform to the position of the object 3. For example, a retroreflective material functioning as a marker is attached to the object 3, and the detector 12 detects the position of the marker by using the image obtained by capturing the retroreflective material with the camera 4. If the positional relationship between the marker position and the texture image is determined in advance, it is possible to project the texture image so as to comfort to the position of the object 3 according to the detected marker position.

In the first to third embodiments, the calibrator 13 for calculating a coordinate transformation matrix that associates each pixel of the image with the visible light projected by the visible light projector 6 with each pixel of the camera 4 is described. However, the calibration processing by the calibrator 13 has only to associate each pixel of the image with visible light projected by the visible light projector 6 with each pixel of the camera 4. Therefore, the calibrator 13 is not limited to calculating the coordinate transformation matrix, and has only to determine the coordinate transformation information that associates each pixel of the image with visible light projected by the visible light projector 6 with each pixel of the camera 4.

In the first to third embodiments, as an example of the detection means, the detector 12 for measuring the shapes and positions (what is called, depths) of the screen 2 and the object 3 by using the space encoding method is described. The detection means has only to be capable of measuring the shapes and positions of the screen 2 and the object 3. Therefore, the detection means is not limited to means using the space encoding method. For example, the detection means may use a stereo method in which the same feature point is captured by two cameras and feature point matching is performed. In addition, the detection means may use the Time of Flight (TOF) method.

In the first embodiment, an example in which a plane on which calibration is performed (calibration plane) coincides with the screen plane 2 is described. However, the calibration plane may be a plane away from the screen plane 2 by a predetermined distance S and parallel to the screen plane 2. For example, the calibration plane is set to a position (for example, S=1 m) where the object 3 such as a person moves during demonstration of the projection mapping. In this case, the deviation amount Mm1 and the projection width hp of the projection image are respectively expressed by the following mathematical expression 6 and mathematical expression 7 instead of mathematical expression 1 and mathematical expression 2.

[Mathematical 6]

$$Mm1 = B\frac{d}{D-S} \qquad \text{(Expression 6)}$$

[Mathematical 7]

$$hp = Hp\frac{D-S-d}{D} \qquad \text{(Expression 7)}$$

where D is the distance in the z direction between the camera 4 and the screen 2 and d is the distance in the z direction between the calibration plane and the mapping plane or object 3.

In the second embodiment, means for measuring the actual measurement amount Mm2 of the deviation only at one actual measurement position is described as an example of the actual measurement operation. However, the actual measurement amount of the deviation at a plurality of positions with different positions in the z direction may be measured, and the correction amount for correcting the deviation may be calculated by linear interpolation based on a plurality of measurement amounts.

As described above, the embodiments are described as the exemplification of the technique in the present disclosure. For that, the accompanying drawings and the detailed description are provided.

Therefore, among the components described in the accompanying drawings and the detailed description, not only the components essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiments are for illustrating the technique in the present disclosure, various changes, substitutions, additions, omissions, and the like can be made within the scope of the claims or the equivalent thereof.

The present disclosure is applicable to various uses for projecting an image onto an object.

What is claimed is:

1. A projection system comprising:
    a visible light projector for projecting an image with visible light onto the object;
    a camera for capturing an image of the object, the camera having an optical axis not coinciding with an optical axis of the visible light projector;
    an image processor for generating an image to be projected with visible light onto the object based on the image captured by the camera; and
    an operation unit,
    wherein:
    the image processor includes:
        a corrector for correcting a deviation between a projection image and the object caused by a difference between the optical axis of the visible light projector and the optical axis of the camera according to a position of the object, the corrector configured to calculate a projection region on the object onto which an image is projected by the visible light projector, and
        an image generator configured to generate image data to project the image to be projected onto the object onto the projection region; and
    the corrector corrects the position of the object based on a measurement value, input by the operation unit, of a deviation amount between a position of an image projected by the visible light projector and the position of the object.

2. A projection system comprising:
    a visible light projector for projecting an image with visible light onto the object;
    a camera for capturing an image of the object, the camera having an optical axis not coinciding with an optical axis of the visible light projector; and
    an image processor for generating an image to be projected with visible light onto the object based on the image captured by the camera;
    wherein:
    the image processor includes:
        a corrector for correcting a deviation between a projection image and the object caused by a difference between the optical axis of the visible light projector and the optical axis of the camera according to a position of the object, the corrector configured to calculate a projection region on the object onto which an image is projected by the visible light projector, and
        an image generator configured to generate image data to project the image to be projected onto the object onto the projection region; and
    the corrector corrects the position of the object according to the position of the object in a direction perpendicular to a direction of the optical axis of the camera.

3. The projection system according to claim 2, further comprising an operation unit, wherein
    the corrector corrects the position of the object based on a measurement value, input by the operation unit, of a deviation amount between a position of an image projected by the visible light projector and the position of the object.

4. A projection system comprising:
    a visible light projector for projecting an image with visible light onto the object;
    a camera for capturing an image of the object, the camera having an optical axis not coinciding with an optical axis of the visible light projector;
    an image processor for generating an image to be projected with visible light onto the object based on the image captured by the camera; and
    an operation unit,
    wherein:
    the image processor includes:
        a corrector for correcting a deviation between a projection image and the object caused by a difference between the optical axis of the visible light projector and the optical axis of the camera according to a position of the object, the corrector configured to calculate a projection region on the object onto which an image is projected by the visible light projector, and
        an image generator configured to generate image data to project the image to be projected onto the object onto the projection region;
    the corrector corrects the position of the object according to a distance in a direction of the optical axis of the camera between the camera and the object; and
    the corrector corrects the position of the object based on a measurement value, input by the operation unit, of a deviation amount between a position of an image projected by the visible light projector and the position of the object.

* * * * *